(12) United States Patent
Kobayashi et al.

(10) Patent No.: US 7,008,116 B2
(45) Date of Patent: Mar. 7, 2006

(54) OPTICAL CONNECTOR ADAPTER HAVING AN ENGAGING PORTION WHICH IS RENDERED MOVABLE BY THE USE OF A SLIT

(75) Inventors: Hirotada Kobayashi, Tokyo (JP); Akihiro Onogawa, Tokyo (JP); Yuichi Koreeda, Tokyo (JP); Yasutaka Hiroki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/978,114

(22) Filed: Oct. 29, 2004

(65) Prior Publication Data

US 2005/0094943 A1    May 5, 2005

(30) Foreign Application Priority Data

Oct. 31, 2003   (JP)   ............................. 2003-373390

(51) Int. Cl.
  *G02B 6/38*   (2006.01)

(52) U.S. Cl. ............................. 385/55; 385/53; 385/56; 385/76; 385/86

(58) Field of Classification Search ............ 385/53–56, 385/69–76, 81–86
  See application file for complete search history.

(56) References Cited

U.S. PATENT DOCUMENTS

| 5,073,042 A | * | 12/1991 | Mulholland et al. | .......... 385/69 |
| 2005/0069263 A1 | * | 3/2005 | Onogawa et al. | ............. 385/55 |

FOREIGN PATENT DOCUMENTS

| JP | 8-7302 B2 | 1/1996 |
| JP | 3000342 B2 | 11/1999 |

* cited by examiner

*Primary Examiner*—Phan T. H. Palmer
(74) *Attorney, Agent, or Firm*—Frishauf, Holtz, Goodman & Chick, P.C.

(57) ABSTRACT

In an optical connector adapter for use in connecting first and second optical connectors to each other, the optical connector adapter includes a shell member which has a wall portion defining an opening and which receives the first optical connector. The opening is received with an insert member adapted to guide the second optical connector. The insert member includes a flange portion extending outward in a radial direction. The flange portion has an extending end face faced to the wall portion, an engaging portion formed on the extending end face, and a slit allowing the engaging portion to be movable away from the wall portion. The wall portion has an engaged portion to be engaged with the engaging portion of the flange portion.

15 Claims, 10 Drawing Sheets

OPTICAL CONNECTOR ADAPTER HAVING AN ENGAGING PORTION WHICH IS RENDERED MOVABLE BY THE USE OF A SLIT

This application claims priority to prior Japanese patent application JP 2003-373390, the disclosure of which is incorporated herein by reference.

BACKGROUND OF THE INVENTION

This invention relates to an adapter (which will be called an "optical connector adapter" in the present specification) for use in optically connecting a pair of optical connectors.

For example, Japanese Patent Publication (JP-B) No. 8-7302 discloses an optical connector adapter of the type. The optical connector adapter comprises a first shell for receiving a first optical connector plug inserted therein and a second shell for receiving a second optical connector plug inserted therein. The first and the second shells are removably fastened to each other. When the first and the second optical connector plugs are inserted into the first and the second shells, respectively, the first and the second optical connector plugs are optically connected to each other.

Japanese Patent (JP-B) No. 3000342 discloses another optical connector adapter. The optical connector adapter has a lock lever for locking two shells in a butted state. The lock lever is rotated to bring the shells into a locked state or an unlocked state.

However, each of the optical connector plugs has a large number of parts and a complicated structure so that a space-saving design is difficult to achieve. Since a special jig or tool is required in an assembling operation, the number of assembling steps is increased and the assembling operation can not be simplified.

SUMMARY OF THE INVENTION

It is therefore an object of the present invention to provide an optical connector adapter which requires a small number of parts and has a small size and a simple structure.

It is another object of the present invention to provide an optical connector adapter which can be assembled without requiring a special jig or tool.

Other objects of the present invention will become clear as the description proceeds.

According to an aspect of the present invention, there is provided an optical connector adapter for use in connecting first and second optical connectors to each other, the optical connector adapter comprising a first shell member having a wall portion defining an opening, the first shell member being for receives the first optical connector, and an insert member received in the opening and adapted to guide the second optical connector, the insert member including a flange portion extending outward in a radial direction, the flange portion having an extending end face faced to the wall portion, an engaging portion formed on the extending end face, and a slit allowing the engaging portion to be movable away from the wall portion, the wall portion having an engaged portion to be engaged with the engaging portion.

According to another aspect of the present invention, there is provided an optical connector adapter for use in connecting first and second optical connectors to each other, the optical connector adapter comprising a first shell member for receiving the first optical connector and a second shell member for receiving the second optical connector and connected to the first shell member, the second shell member having an engaged portion and a lock lever connected to the first shell member for locking the first and the second shell members to each other in a connected state of the first and the second shell members, the lock lever having an engaging portion which is engaged with the engaged portion in the connected state to maintain a position of the lock lever, the second shell member having a slit which extends in the vicinity of the engaged portion for allowing the engaged portion to be movable away from the engaging portion.

DESCRIPTION OF THE PREFERRED EMBODIMENTS

Figure 1:
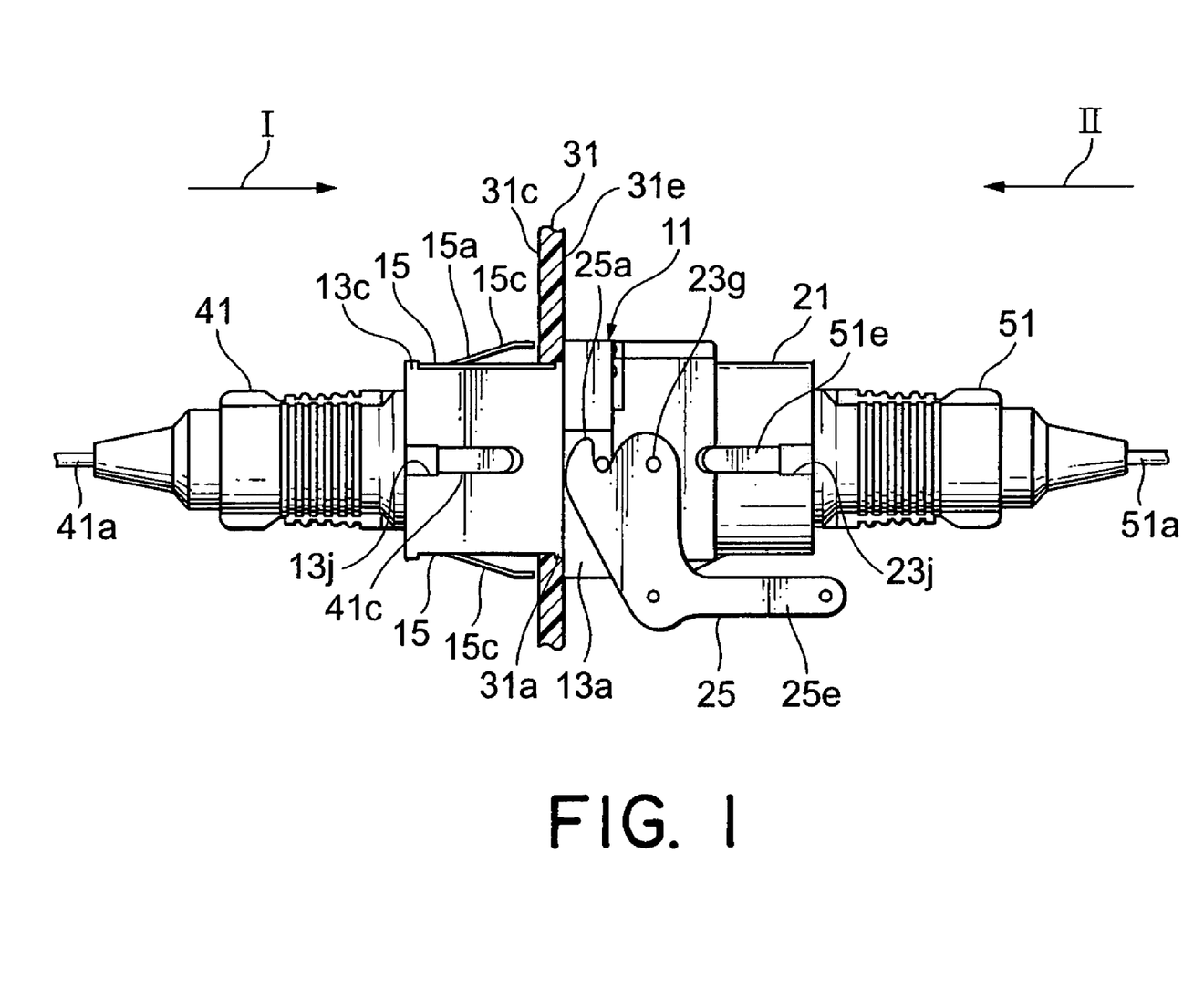
FIG. 1 is a side view of an optical connector adapter according to a first embodiment of the present invention when the optical connector adapter is connected to first and second optical connectors.
Figure 2:
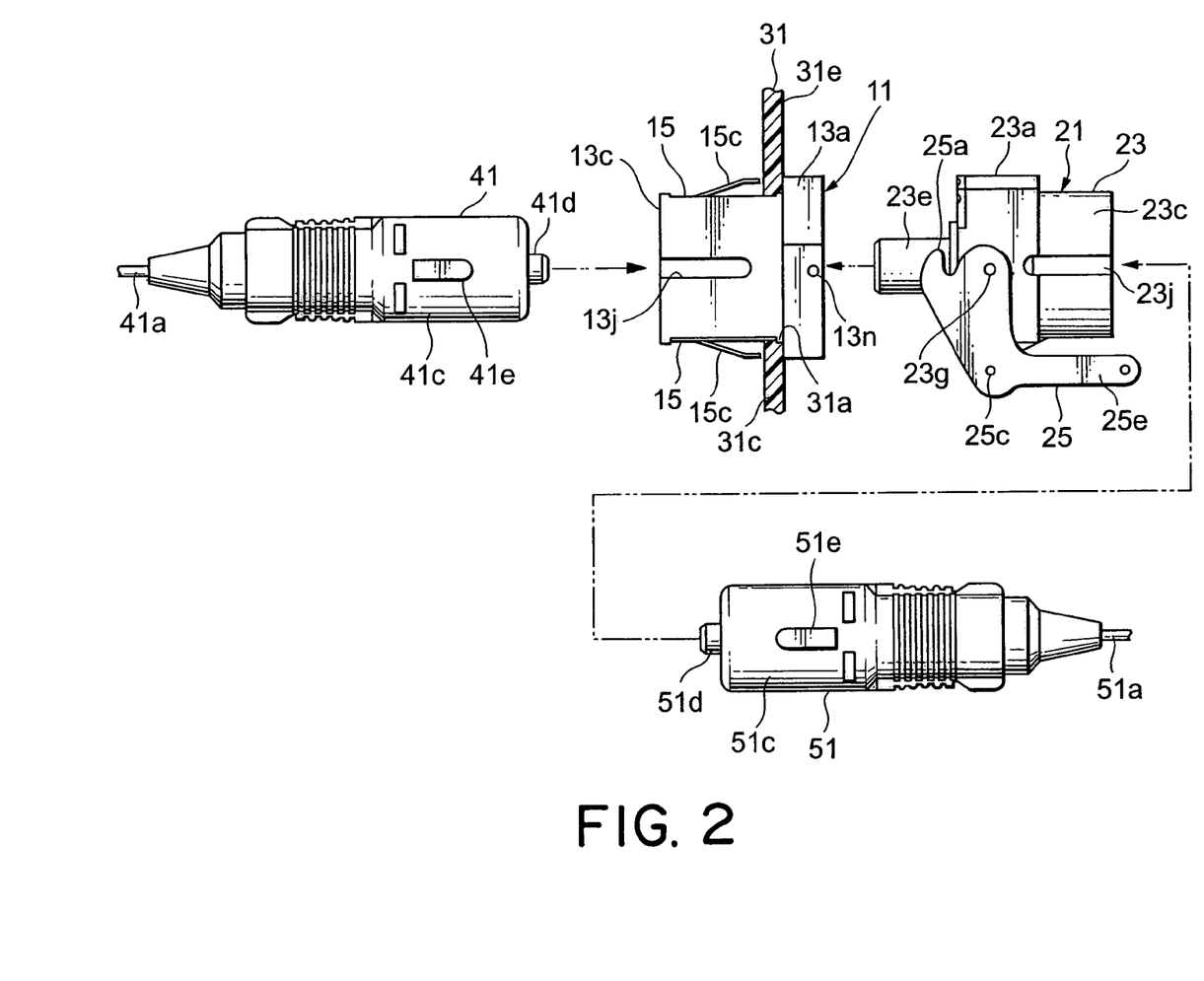
FIG. 2 is an exploded side view of the optical connector adapter and the first and the second optical connectors illustrated in FIG. 1.

Referring to FIGS. 1 and 2, description will be made of an optical connector adapter according to a first embodiment of the present invention.

The optical connector adapter illustrated in the figure is used in an electric or electronic apparatus and is for optically connecting a pair of optical connector plugs 41 and 51 to each other. Generally, the electric or electronic apparatus is provided with various panels one of which is depicted herein as a particular panel 31 having a through hole 31a used for attaching the optical connector adapter. For convenience of the description, right side area of the panel 31 in the figure is called hereunder an outside of the electric or electronic apparatus, left side area of the panel 31 in the figure being called hereunder an inside of the electric or electronic apparatus.

The optical connector adapter comprises a first shell 11 and a second shell 21 removably connected to the first shell 11. The first shell 11 is inserted into the through hole 31a of the panel 31. The second shell 21 is connected to the first shell 11 from the outside of the apparatus. Into the first shell 11, the first optical connector plug 41 is inserted in a first direction I from the inside of the apparatus. Into the second shell 21, the second optical connector plug 51 is inserted in a second direction II. The first and the second optical connector plugs 41 and 51 inserted into the first and the second shells 11 and 21 are optically connected to each other.

Referring to FIGS. 3 to 7 in addition, the optical connector adapter will be described in detail.

Figure 3:
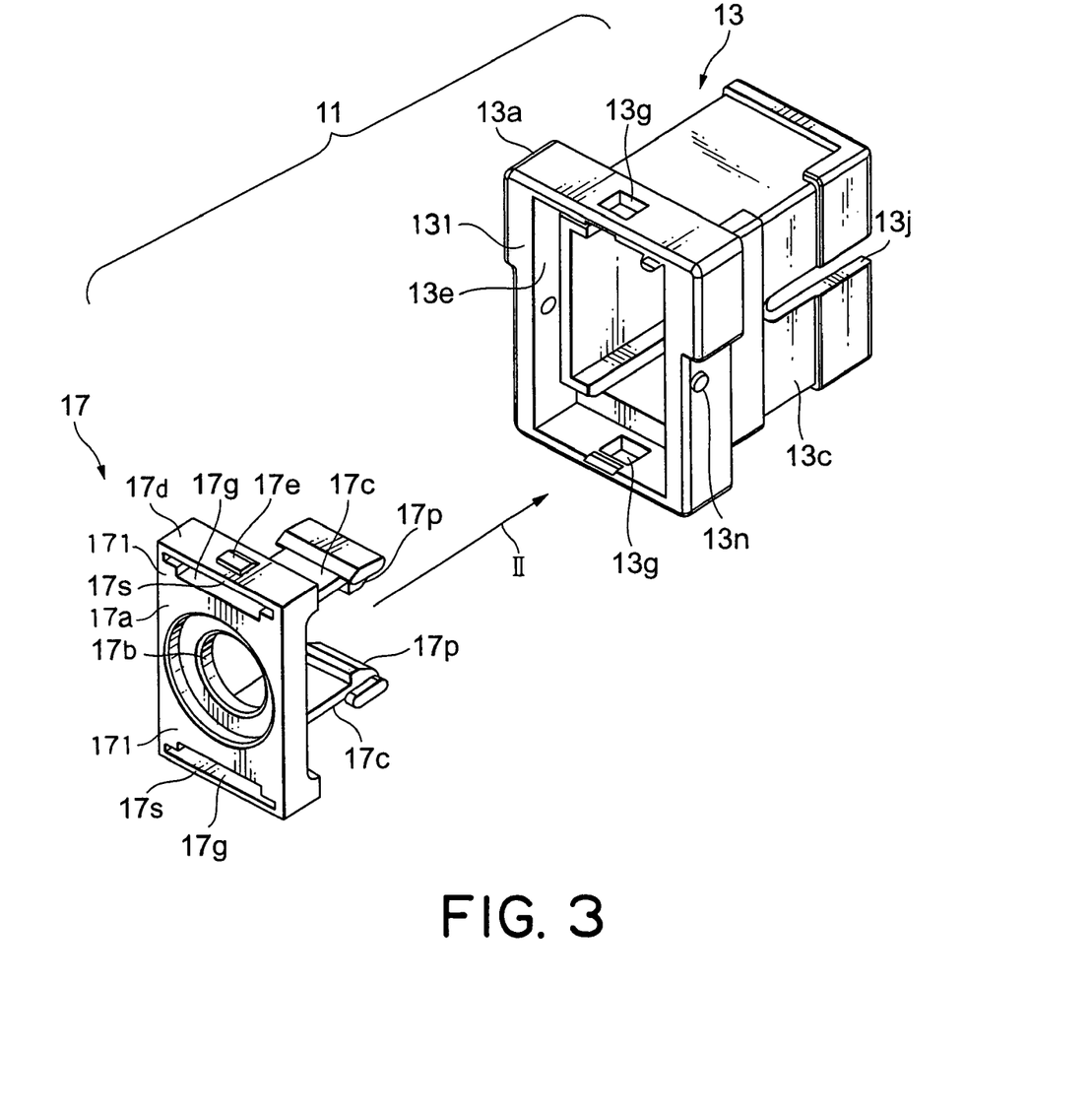
FIG. 3 is a perspective view of a first shell and an insert member in the optical connector adapter illustrated in FIGS. 1 and 2.

The first shell 11 comprises a first shell member 13 inserted in the second direction II into the through hole 31a of the panel 31 and attached to the panel 31, a fixing member 15 held on an outer peripheral surface of the first shell member 13 at the inside of the panel 31, and an insert member 17 held in the first shell member 13. The first shell member 13 has a first flange portion 13a having a size greater than the through hole 31a of the panel 31 to confront an outer surface of the panel 31, and a first shell cylinder portion 13c connected to the first flange portion 13a so as to be inserted into the through hole 31a of the panel 31.

The first flange portion 13a has a wall portion 131 forming a rectangular frame and defining an opening 13e communicating with the first shell cylinder portion 13c. The wall portion 131 has upper and lower parts provided with a pair of first engaged portions 13g, respectively, each of which is a through hole penetrating from an outer surface of the wall portion 131 into the opening 13e. The wall portion 131 has left and right side parts provided with a pair of shaft portions 13n protruding outward, respectively. On the other hand, the first shell cylinder portion 13c has opposite side surfaces provided with a pair of cut portions 13j extending frontward from a rear end of the first shell cylinder portion 13c, respectively.

Figure 7:
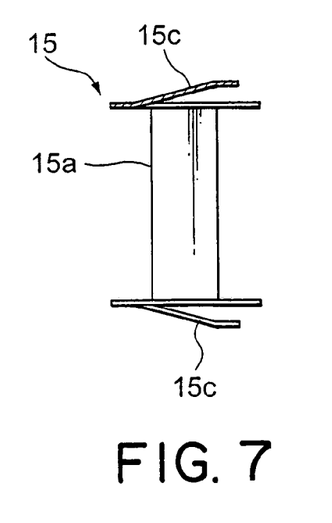
FIG. 7 is a partially-sectional side view of a fixing member illustrated in FIG. 1.

As clearly shown in FIGS. 1, 2, and 7, the fixing member 15 has a fixing portion 15a held on an outer peripheral surface of the first shell cylinder portion 13c, and a pair of fixing engaging portions 15c having one ends connected to the fixing portion 15a and the other ends as free ends. The fixing engaging portions 15c extend away from the outer peripheral surface of the first shell cylinder portion 13c towards the first flange portion 13a.

The insert member 17 is generally called a nail plate in the art and has a rectangular base plate portion 17a inserted into the opening 13e of the first shell member 13, and a pair of engaging arm portions 17c extending from the base plate portion 17a to be inserted into the first shell cylinder portion 13c. Each of the engaging arm portions 17c extends from the base plate portion 17a in a cantilevered fashion to be elastically deformable. The engaging arm portions 17c serve as a guide when the first optical connector plug 41 is inserted into the first shell cylinder portion 13c and also serve to engage, with an elastic force, the first optical connector plug 41 by a pair of hook portions 17p formed at free ends thereof, respectively.

Figure 4:
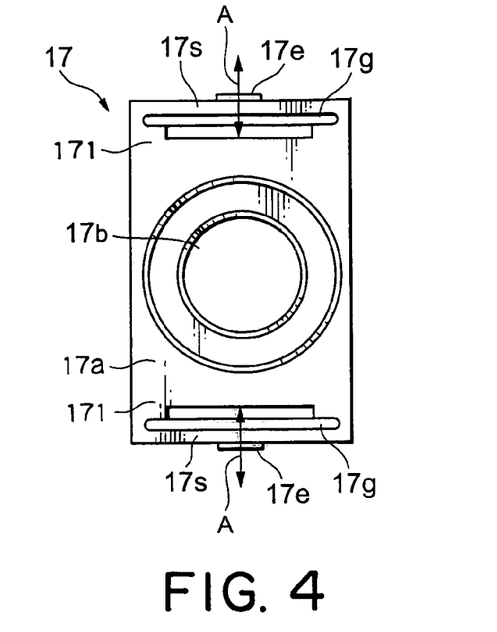
FIG. 4 is a front view of the insert member illustrated in FIG. 3.
Figure 5:
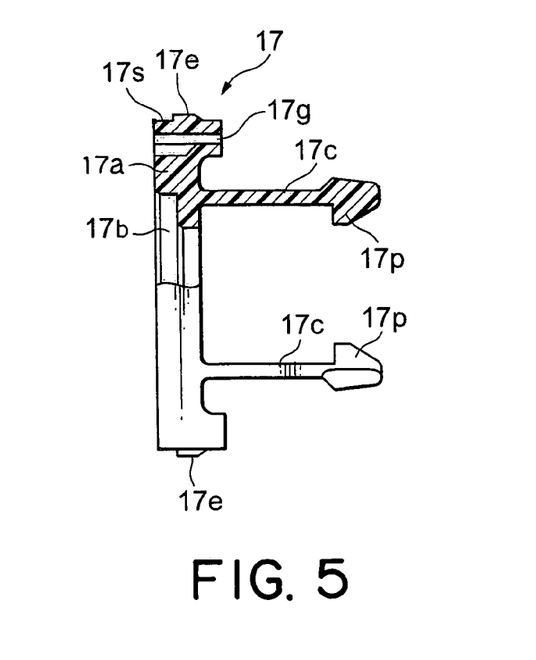
FIG. 5 is a partially-sectional side view of the insert member illustrated in FIG. 3.
Figure 6A:
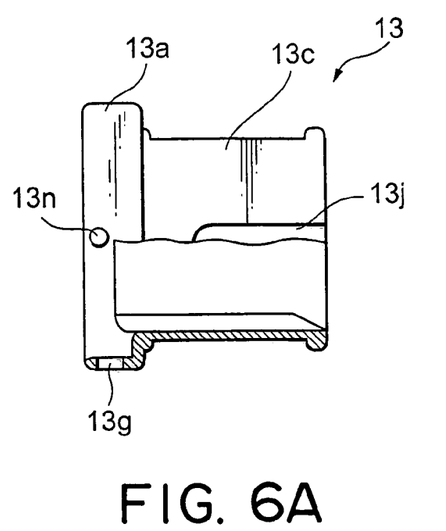
FIG. 6A is a partially-sectional side view of a first shell member illustrated in FIG. 3.
Figure 6B:
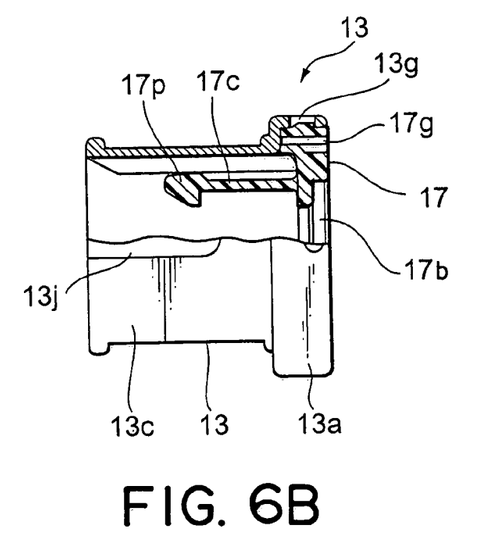
FIG. 6B is a partially-sectional side view of the insert member and the first shell member illustrated in FIG. 3.

The base plate portion 17a has a guide hole 17b formed at the center for insertion of an end portion of the second shell 21, and a pair of flange portions 171 formed on opposite sides of the guide hole 17b in a radial direction and extending outward in the radial direction. Each of the flange portions 171 of the insert member 17 has an extending end face 17d faced to the wall portion 131, an engaging portion 17e comprising a protrusion protruding from the extending end face 17d, and a slit 17g allowing the engaging portion 17e to be movable away from the wall portion 131. The slit 17g extends in the vicinity of the extending end face 17d substantially in parallel to the extending end face 17d so that a relatively thin plate part 17s serving as an elastically deformable bridge portion is formed between the extending end face 17d and the slit 17g. The engaging portion 17e is formed on the above-mentioned bridge portion, i.e., the plate part 17s.

When insertion of the base plate portion 17a into the opening 13e of the first shell member 13 is started, the engaging portion 17e is pressed by the wall portion 131 so that the plate part 17s is elastically deformed. When the insertion of the base plate portion 17a progresses, the engaging portion 17e is faced to the first engaged portion 13g and the protrusion (namely, the engaging portion 17e) is fitted into the through hole (namely, the first engaged portion 13g) so that the plate part 17s is recovered into an initial shape. As a result, the engaging portion 17e is engaged with the first engaged portion 13g so that the insert member 17 is fixed to the first shell member 13. Since the engaging portion 17e is rendered movable by the use of the slit 17g, it is possible to reduce the number of parts and simplify the structure. The plate part 17s is elastically deformable in a direction depicted by an arrow A in FIG. 4.

The first optical connector plug 41 has a first casing member 41c holding an optical fiber 41a. The optical fiber 41a is held by the first casing member 41c with its end exposed at an end face of an end portion 41d of the first optical connector plug 41. The first casing member 41a has an outer surface provided with a pair of ridge portions 41e inserted into the cut portions 13j formed on the first shell member 13.

As illustrated in FIGS. 1 and 2, the second shell 21 comprises a second shell member 23 to be attached to the first flange portion 13a, and a pair of lock levers 25 rotatably attached to left and right sides the second shell member 23, respectively. The lock levers 25 are designed to be engaged with the shaft portions 13n of the first shell member 13 with being rotatably moved in the manner which will later be described. The second shell member 23 has a second flange portion 23a, a second shell cylinder portion 23c connected to the second flange portion 23a, and a second cylindrical portion 23e protruding from the second flange portion 23a on a side opposite to the second shell cylinder portion 23c.

The second flange portion 23a is provided with a pair of rotation shafts 23g supporting the lock levers 25 so that each of the lock levers 25 is rotatable between the first and the second shell members 11 and 21 along a circular path. The lock lever 25 has a first lever engaging portion 25a to be engaged with the shaft portion 13n on the circular path, a second lever engaging portion 25c for holding a locked state of the first and the second shells 11 and 21 when the first lever engaging portion 25a is engaged with the shaft portion 13n, and an operating portion 25e for rotating the lock lever 25 around the rotation shaft 23g. The second lever engaging portion 25c is engaged with a second engaged portion (not shown) formed on the second flange portion 23a to maintain the locked state.

The second shell cylinder portion 23c is provided with a pair of cut portions 23j formed on opposite side surfaces thereof and extending towards the second flange portion 23a from an end of the second shell cylinder portion 23c where the second optical connector plug 51 is inserted. The second optical connector plug 51 has a second casing member 51c holding an optical fiber 51a. The optical fiber 51a is held by the second casing member 51c with its end exposed at an end face of an end portion 51d of the second optical connector plug 51. The second casing member 51a has an outer surface provided with a pair of ridge portions 51e inserted into the cut portions 23j formed on the second shell member 23.

Next, description will be made of an assembling operation of the above-mentioned optical connector adapter.

Upon assembling the optical connector adapter, the insert member 17 is at first inserted into the opening 13e of the first shell member 13 illustrated in FIG. 3 with the engaging arm portions 17c positioned frontward. Then, the engaging portions 17e are butted against the wall portion 131. When the insert member 17 is further pushed inward, the engaging portions 17e are pushed by the wall portion 131 to elastically deform the plate part 17s. When the insert member 17 is further pushed inward, the engaging portions 17e are faced to the first engaged portions 13g to be engaged therewith. Therefore, the first shell member 13 and the insert member 17 are integrally coupled and fixed to each other.

In the state where the first shell member 13 and the insert member 17 are integrally engaged with each other, the first shell 11 is inserted into the through hole 31a formed on the panel 31. At this time, the first shell cylinder portion 13c protrudes from a first surface 31c of the panel 31 as an inner surface facing the inside of the apparatus. The first flange portion 13a is brought into contact with a second surface 31e of the panel 31 as the outer surface facing the outside of the apparatus. The free ends of the fixing engaging portions 15c of the fixing member 15 are faced to the first surface 31c of the panel 31. Thus, the first shell 11 is held by the panel 31 via the first flange portion 13a and the fixing engaging portions 15c.

Thereafter, the first optical connector plug 41 is inserted into the first shell cylinder portion 13c of the first shell member 13. At this time, the ridge portions 41e of the first optical connector plug 41 are inserted into the cut portions 13j of the first shell member 13.

On the other hand, the second optical connector plug 51 is inserted into the second shell cylinder portion 23c of the second shell member 23. At this time, the ridge portions 51e of the second optical connector plug 51 are inserted into the cut portions 23j of the second shell member 23.

As described above, the assembling operation of the optical connector adapter does not require a special jig or tool. It is therefore possible to considerably reduce the number of assembling steps and to simplify the assembling operation.

Then, the second shell 21 is fastened to the first shell 11 in the following manner.

Prior to fastening, the operating portion 25e is gripped and moved to rotate the lock lever 25 around the rotation shaft 23g counterclockwise from a position illustrated in FIGS. 1 and 2. In this state, the second cylindrical portion 23e of the second shell member 23 is inserted into the guide hole 17b of the insert member 17. After the first and the second flange portions 13a and 23a are brought into contact with each other, the operating portion 25e of the lock lever 25 is rotated clockwise. Then, the first engaging portion 25a of the lock lever 25 is engaged with the shaft portion 13n. Simultaneously, the second lever engaging portion 25c is engaged with a second engaged portion (not shown) to maintain the locked state.

In order to separate the second shell 21 from the first shell 11, the operating portion 25e is gripped and moved to rotate the lock lever 25 around the rotation shaft 23g clockwise from the position illustrated in FIGS. 1 and 2. By this operation, the second lever engaging portion 25c is released from the second engaged portion (not shown) to release the locked state. Simultaneously, engagement between the first lever engaging portion 25a of the lock lever 25 and the shaft portion 13n is released. Therefore, the second shell 21 becomes separable from the first shell 11.

The first shell member 13 is made of a metal or a resin molded product. As the insert member 17, it is desired to use a resin molded product because the insert member 17 is elastically deformed by the first flange portion 13a.

Figure 8:
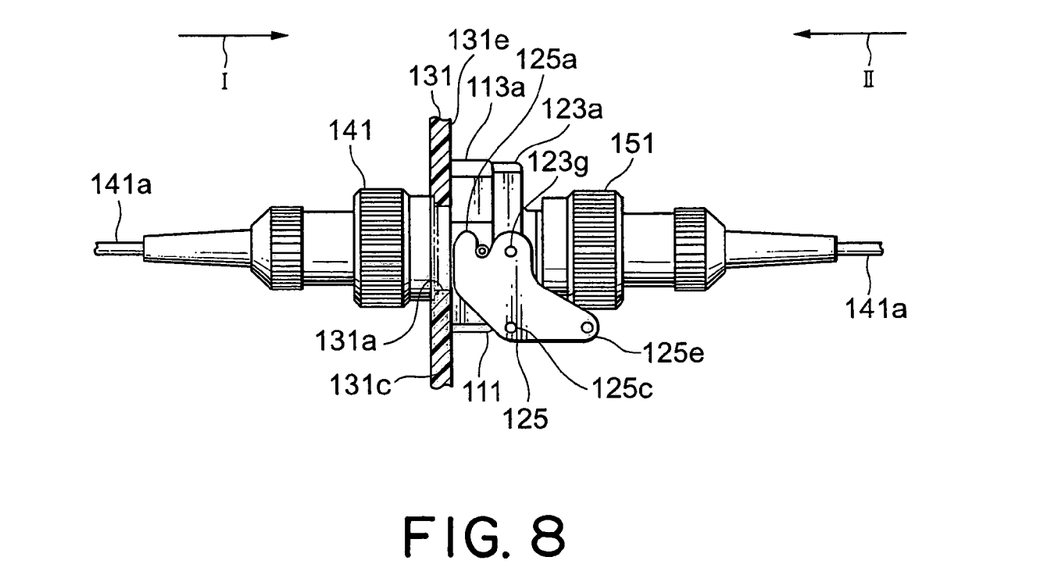
FIG. 8 is a side view of an optical connector adapter according to a second embodiment of the present invention when the optical connector adapter is connected to first and second optical connectors.
Figure 9:
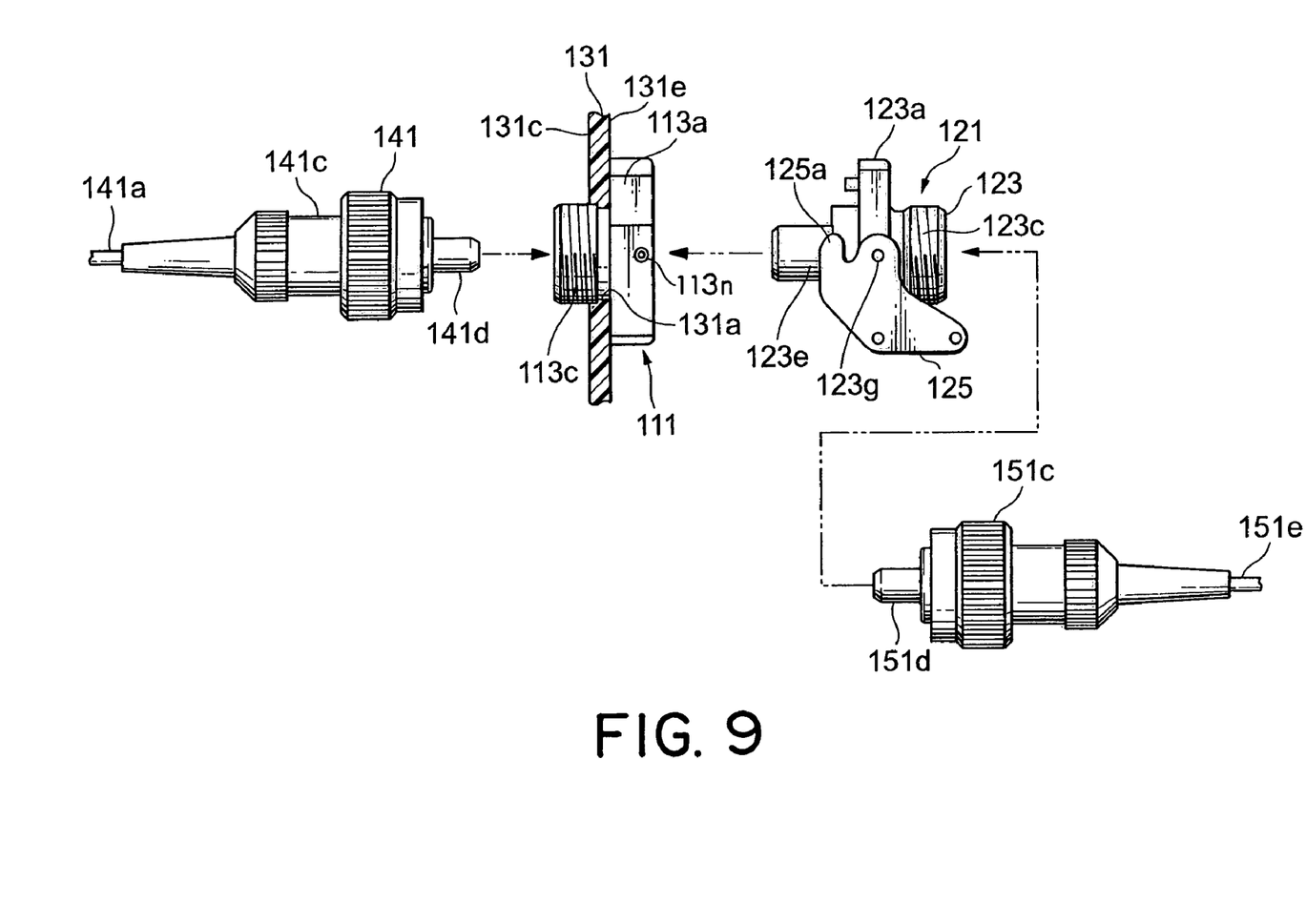
FIG. 9 is an exploded side view of the optical connector adapter and the first and the second optical connectors illustrated in FIG. 8.

Referring to FIGS. 8 and 9, an optical connector adapter according to a second embodiment of the present invention will be described.

The optical connector adapter illustrated in the figure comprises a first shell 111 and a second shell 121 removably connected to the first shell 111. The first shell 111 is inserted into a hole 131a of a panel 131 of an apparatus (not shown). The second shell 121 is connected to the first shell 111 from an outside of the panel 131. Into the first shell 111, a first optical connector plug 141 is inserted from an inside of the panel 131 in a first direction I. Into the second shell 121, a second optical connector plug 151 is inserted in a second direction II. The first and the second optical connector plugs 141 and 151 inserted into the first and the second shells 111 and 121 are optically connected to each other.

Figure 10:
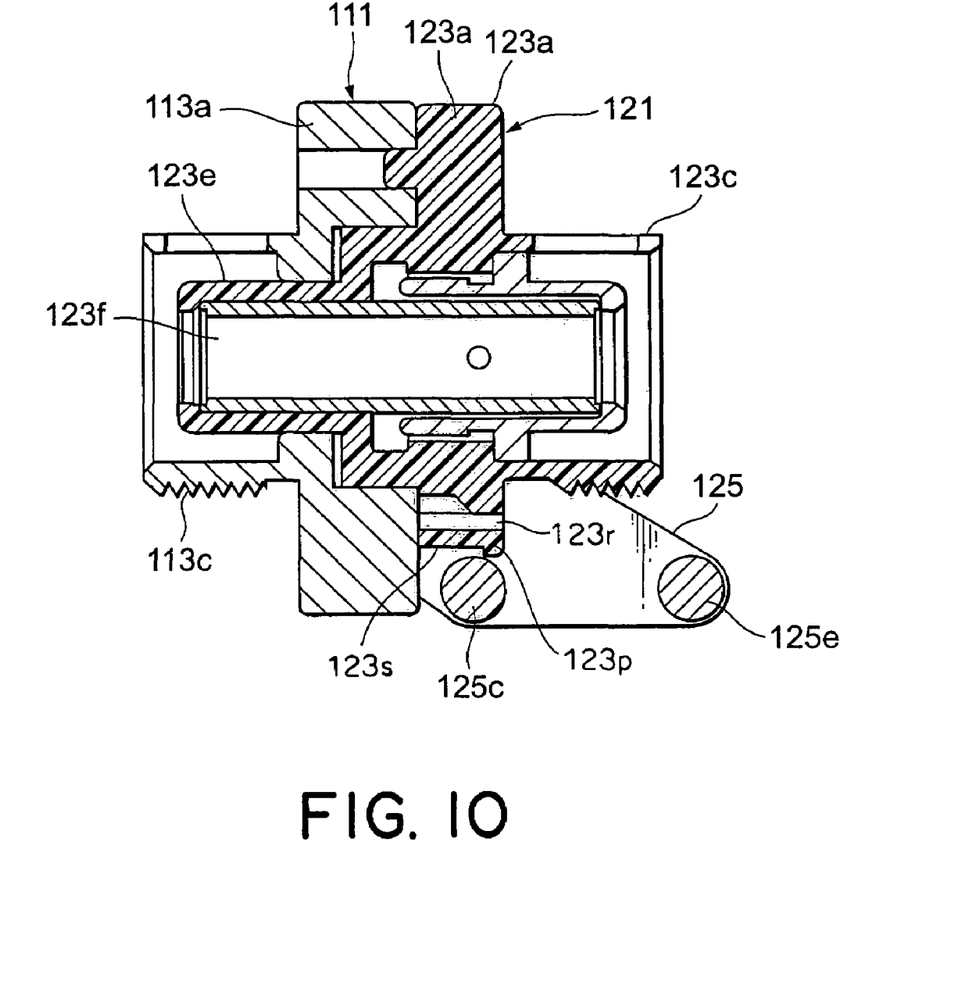
FIG. 10 is a sectional view of the optical connector adapter illustrated in FIG. 8 in an engaged state.
Figure 11A:
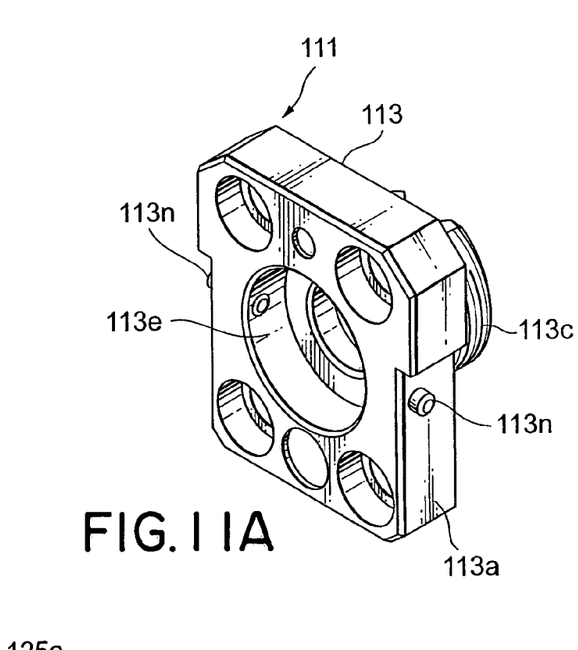
FIG. 11A is a perspective view of a first shell illustrated in FIG. 9.
Figure 11B:
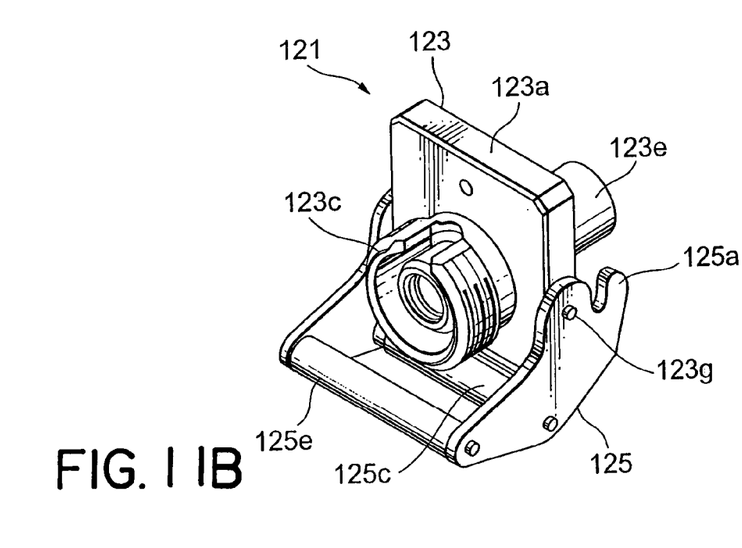
FIG. 11B is a perspective view of a second shell illustrated in FIG. 9.
Figure 12:
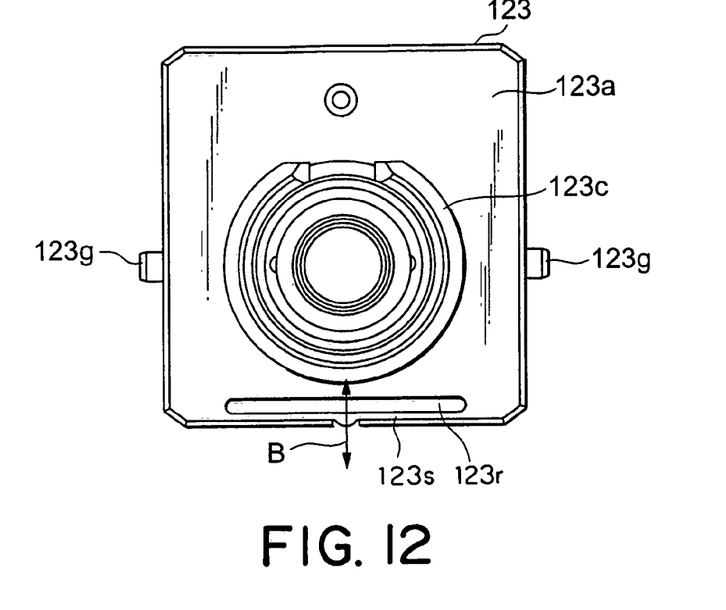
FIG. 12 is a front view of the second shell illustrated in FIG. 11B in a state where a lock lever is removed.
Figure 13:
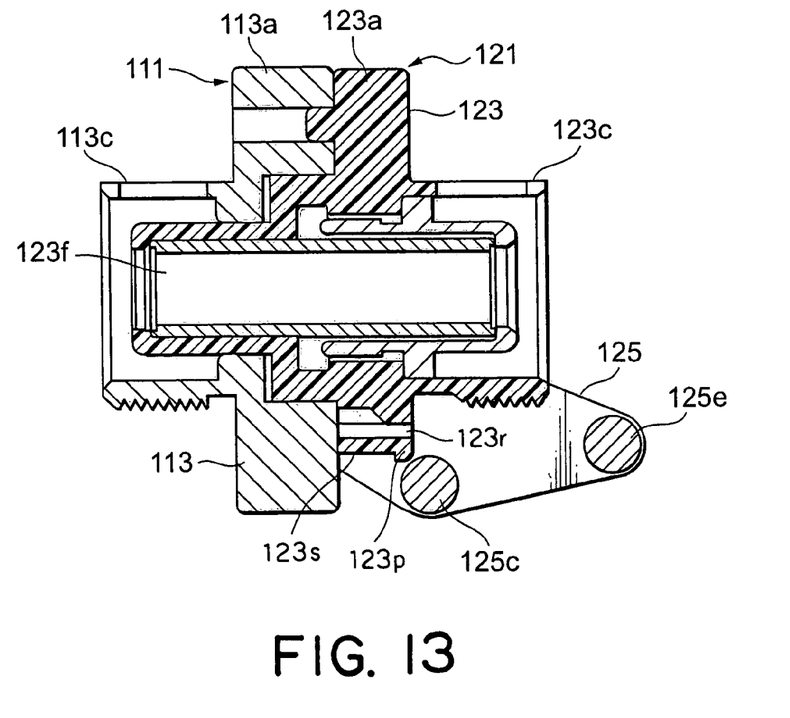
FIG. 13 is a sectional view of the optical connector adapter illustrated in FIG. 8 in a disengaged state.

Referring to FIGS. 10 through 12 in addition, the optical connector adapter will be described in detail.

The first shell 111 comprises a first shell member 113 inserted in the second direction II into the hole 131a formed in the panel 131 and attached to the panel 131, a fixing member 115 held on an outer peripheral surface of the first shell member 113 at the inside the panel 131, and an insert member 117 held in the first shell member 113. The first shell member 113 has a first flange portion 113a having a size greater than the hole 131a of the panel 131 and confronting an outer surface of the panel 131 at the outside of the panel 131, and a first shell cylinder portion 113c connected to the first flange portion 113a so as to be inserted into the hole 131a of the panel 131.

The first flange portion 113a is provided with an opening 113e communicating with the first shell cylinder portion 113c. The first flange portion 113a has opposite side surfaces faced to each other and provided with a pair of shaft portions 113n, respectively. The first shell cylinder portion 113c has an outer peripheral surface provided with a screw groove.

The first optical connector plug 141 has a first casing member 141c holding an optical fiber 141a. The optical fiber 141a is held by the first casing member 141c. The optical fiber 141a has en end exposed at an end face of an end portion 141d of the first optical connector plug 141.

The second shell 121 comprises a second shell member 123 to be attached to the first flange portion 113a, and a pair of lock levers 125 attached to the second shell member 123 so as to be engaged with the shaft portion 113n of the first shell member 113. The second shell member 123 has a second flange portion 123a, a second shell cylinder portion 123c connected to the second flange portion 123a, and a second cylindrical portion 123e protruding from the second flange portion 123a on a side opposite to the second shell cylinder portion 123c. As illustrated in FIG. 10, the second shell member 123 is provided with a long sleeve-like aligning member 123f disposed inside and extending in the first and the second directions I and II over the second flange portion 123a, the second shell cylinder portion 123c, and the second cylindrical portion 123e.

The lock lever 125 has a first lever engaging portion 125a to be engaged with the shaft portion 113n on a circular path, a second lever engaging portion 125c for holding a locked state of the first and the second shells 111 and 121 when the first lever engaging portion 125a is engaged with the shaft portion 113n, and an operating portion 125e for rotating the lock lever 125 around a rotation shaft 123g. The second lever engaging portion 125c is engaged with a second engaged portion (not shown) formed on the second flange portion 123a to maintain the locked state.

The second flange portion 123a has the rotation shaft 123g rotatably supporting the lock lever 125, the second engaged portion 123p protruding from a lower end, and a slit 123r formed in the vicinity of the second engaged portion 123p. When the second engaged portion 123p is pressed by the second lever engaging portion 125c, a part of the second flange portion 123a which is adjacent to the slit 123r is elastically deformed. Thus, by forming the slit 123r, that part of the second flange portion 123a where the second engaged portion 123p is located is formed into a thin plate portion 123s. Therefore, the thin plate portion 123s is bent and elastically deformed when the second engaged portion 123p is pressed. When pressing of the second engaged portion 123p is released, the thin plate portion 123s is recovered into an initial shape. Since the second engaged portion 123p is rendered movable by the use of the slit 123r, it is possible to realize reduce the number of parts and to simplify the structure. The thin plate portion 123s is elastically deformed in a direction depicted by an arrow B in FIG. 12.

The second optical connector plug 151 has a second casing member 151c holding an optical fiber 151a. The optical fiber 151a is held by the second casing member 151c. The optical fiber 151a has an end exposed from [on] an end face of an end portion 151d of the second optical connector plug 151.

Next, an assembling operation of the optical connector adapter will be described.

Upon assembling the optical connector adapter, the first shell cylinder portion 113c is at first screwed and inserted into the hole 131a of the panel 131 so that the first shell 111 is held by the panel 131. At this time, the first shell cylinder portion 113c protrudes from a first surface 131c of the panel 131 as an inner surface facing the inside of the apparatus. The first flange portion 113a is brought into contact with a second surface 131e of the panel 131 as the outer surface facing the outside of the apparatus.

Thereafter, the first optical connector plug 141 is inserted into the first shell cylinder portion 113c of the first shell member 113. On the other hand, the second optical connector plug 151 is inserted into the second shell cylinder portion 123c of the second shell member 123.

As described above, the assembling operation of the optical connector adapter does not require a special jig or tool. It is therefore possible to considerably reduce the number of assembling steps and to simplify the assembling operation.

Then, the second shell 121 is fastened to the first shell 111 in the following manner.

Prior to fastening, the operating portion 125e is gripped and moved to rotate the lock lever 125 around the rotation shaft 123g counterclockwise from a position illustrated in FIGS. 8 through 10. In this state, the second cylindrical portion 123e of the second shell member 123 is inserted into the first shell member 111. After the first and the second flange portions 113a and 123a are brought into contact with each other, the operating portion 125e of the lock lever 125 is rotated clockwise. Then, the second lever engaging portion 125c is brought into contact with the second engaged portion 123p of the first flange portion 113a.

When the lock lever 125 is further rotated, the second engaged portion 123p is pushed towards the second flange portion 123a under a pressing force of the second lever engaging portion 125c. At this time, the thin plate portion 123s adjacent to the slit 123r formed in the second flange portion 123a is elastically deformed. When the lock lever 125 is further rotated, the second lever engaging portion 125c is engaged with the second engaged portion 123p over the second engaged portion 123p. Simultaneously, the first lever engaging portion 125a of the lock lever 125 and the shaft portion 113n are engaged with each other. Thus, the first and the second shells 111 and 121 are integrally engaged with each other into the locked state.

In order to separate the second shell 121 from the first shell 111, the operating portion 125e is gripped and moved to rotate the lock lever 125 around the rotation shaft 123g clockwise from the position illustrated in FIGS. 8 through 10 to release engagement between the first lever engaging portion 125a of the lock lever 125 and the shaft 113n. Simultaneously, the second lever engaging portion 125c is released from the second engaged portion 123p to release the locked state. Therefore, the second shell 121 becomes separable from the first shell 111.

The first shell member 113 is made of a metal or a resin molded product. As the second shell member 123, it is desired to use a resin molded product because the second shell member 123 is elastically deformed.

The optical connector adapter according to this invention is applicable not only to the adapter for optically connecting the first and the second optical connector plugs but also to various types of connector apparatuses for connecting first and second connectors relatively inserted to each other.

While this invention has thus far been described in conjunction with the preferred embodiments thereof, it will be readily possible for those skilled in the art to put this invention into practice in various other manners without departing from the scope of this invention.

What is claimed is:

1. An optical connector adapter for use in connecting first and second optical connectors to each other, the optical connector adapter comprising:
   a first shell member having a wall portion defining an opening, the first shell member being for receiving the first optical connector; and
   an insert member received in the opening and adapted to guide the second optical connector, the insert member including a flange portion extending outward in a radial direction,
   the flange portion having:
   an extending end face faced to the wall portion;
   an engaging portion formed on the extending end face; and
   a slit allowing the engaging portion to be movable away from the wall portion, the wall portion having an engaged portion to be engaged with the engaging portion.

2. The optical connector adapter according to claim 1, further comprising:
   a second shell member for receiving the second optical connector and connected to the first shell member; and
   a lock lever for locking the first and the second shell members to each other in a connected state of the first and the second shell members.

3. The optical connector adapter according to claim 2, wherein the lock lever is rotatably held by the second shell member and has a hook portion, the first shell member having a shaft portion to be engaged with the hook portion.

4. The optical connector adapter according to claim 3, further comprising a mechanism connected to the second shell member and the lock lever for maintaining a position of the lock lever when the hook portion is engaged with the shaft portion.

5. The optical connector adapter according to claim 1, wherein the engaging portion is a protrusion protruding from the extending end face while the engaged portion is a through hole penetrating through the wall portion.

6. The optical connector adapter according to claim 1, wherein the insert member further includes an additional flange portion extending in a direction opposite to the flange portion,
   the additional flange portion having:
   an additional extending end face faced to the wall portion;
   an additional engaging portion formed on the additional extending end face; and
   an additional slit allowing the additional engaging portion to be elastically displaceable away from the wall portion, the wall portion having an additional engaged portion to be engaged with the additional engaging portion.

7. The optical connector adapter according to claim 1, wherein the opening has a rectangular section, the insert member having a shape such that the insert member is fitted and inserted into the opening.

8. The optical connector adapter according to claim 1, wherein the slit extends in the vicinity of the extending end face substantially in parallel with the extending end face to form an elastically deformable bridge portion between the extending end face and the slit, the engaging portion being formed on the bridge portion.

9. The optical connector adapter according to claim 1, wherein the insert member has a guide hole for guiding a part of the second shell member when the second shell member is connected to the first shell member.

10. The optical connector adapter according to claim 1, wherein the insert member has an engaging arm portion extending inside the first shell member, and a hook portion formed on the engaging arm portion and engaged with the first shell member.

11. The optical connector adapter according to claim 1, wherein the first shell member has a flange portion extending outward from a position corresponding to the wall portion.

12. The optical connector adapter according to claim 1, wherein the first shell member is inserted into a through hole formed on a panel, the optical connector adapter including a fixing member attached to an outer periphery of the first shell member, the flange portion of the first shell member being disposed on one side of the panel, the fixing member being disposed on the other side of the panel.

13. An optical connector adapter for use in connecting first and second optical connectors to each other, the optical connector adapter comprising:
   a first shell member for receiving the first optical connector; and
   a second shell member for receiving the second optical connector and connected to the first shell member, the second shell member having an engaged portion; and
   a lock lever connected to the first shell member for locking the first and the second shell members to each other in a connected state of the first and the second shell members,
   the lock lever having an engaging portion which is engaged with the engaged portion in the connected state to maintain a position of the lock lever,
   the second shell member having a slit which extends in the vicinity of the engaged portion for allowing the engaged portion to be movable away from the engaging portion.

14. The optical connector adapter according to claim 13, wherein the lock lever is rotatably held by the second shell member and has a hook portion, the first shell member having a shaft portion to be engaged with the hook portion.

15. The optical connector adapter according to claim 14, wherein the first shell member is inserted into a through hole formed on a panel, the optical connector adapter including a fixing member attached to an outer periphery of the first shell member, the flange portion of the first shell member being disposed on one side of the panel, the fixing member being disposed on the other side of the panel.

* * * * *